United States Patent
Walden et al.

(10) Patent No.: US 7,127,490 B1
(45) Date of Patent: Oct. 24, 2006

(54) METHOD AND APPARATUS FOR CONTENT BASED ROUTING OF MESSAGES

(75) Inventors: Jonathan Walden, Scarsdale, NY (US); Bruce Danziger, Huntington, NY (US)

(73) Assignee: Omnesys Technologies, Inc., Pearl River, NY (US)

( * ) Notice: Subject to any disclaimer, the term of this patent is extended or adjusted under 35 U.S.C. 154(b) by 807 days.

(21) Appl. No.: 10/072,489

(22) Filed: Feb. 7, 2002

Related U.S. Application Data (63) Continuation of application No. 09/963,182, filed on Sep. 25, 2001, now abandoned.

(60) Provisional application No. 60/234,926, filed on Sep. 25, 2000.

(51) Int. Cl.
*G06F 15/16* (2006.01)

(52) U.S. Cl. ............... 709/206; 709/203; 709/205; 709/238; 709/240

(58) Field of Classification Search ............ 709/202, 709/203, 204, 205, 206
See application file for complete search history.

(56) References Cited

U.S. PATENT DOCUMENTS 5,761,415 A * 6/1998 Joseph et al. ............ 709/200
6,199,102 B1 * 3/2001 Cobb ........................ 709/206

* cited by examiner

*Primary Examiner*—Yves Dalencourt
(74) *Attorney, Agent, or Firm*—Jordan and Hamburg LLP (57) ABSTRACT

An apparatus and method for content based routing wherein user may register positive interest criteria for receiving messages and negative interest criteria for prevention of receiving messages. In particular, the method is applicable to processing of else messages which have neither a response nor a request field. The positive interest criteria for else messages is provided in a first minimized table for the client and also in a global table. The negative interest criteria for else messages is provided in a second minimized table for the client.

8 Claims, 6 Drawing Sheets

METHOD AND APPARATUS FOR CONTENT BASED ROUTING OF MESSAGES

REFERENCE TO RELATED APPLICATIONS

This is a Continuation, of application Ser. No 09/963,182 filed Sep. 25, 2001, now Pending.

This application hereby claims priority benefit of provisional patent application Ser. No. 60/234,926, filed Sep. 25, 2000, which is incorporated herein by reference.

REFERENCE TO PROGRAM LISTING

A CD-ROM/CD-R containing program files as identified below is provided as an appendix to this specification and is incorporated herein. The following is a listing of files including name, date, file type and file size in kilobytes contained on the CD-ROM/CD-R. Machine format is IBM PC compatible. The operating system compatibility is IBM PC Windows 95, 98, NT. The creation dates reflect the date that the files were burned onto the CD-ROM/CD-R for filing and not the dates the materials were conceived and written.

| NAME | TYPE | SIZE | | MODIFIED |
|---|---|---|---|---|
| ammgr.h.txt | Text Document | 2 | KB | Tue Sep. 25, 2001 1:30 PM |
| api.c.exe | Application | 29 | KB | Tue Sep. 25, 2001 1:21 PM |
| api.h.txt | Text Document | 293 | B | Tue Sep. 25, 2001 1:21 PM |
| api_c.h.txt | Text Document | 9 | KB | Tue Sep. 25, 2001 1:22 PM |
| api_d.h.txt | Text Document | 16 | KB | Tue Sep. 25, 2001 1:22 PM |
| api_f.h.txt | Text Document | 49 | KB | Tue Sep. 25, 2001 1:23 PM |
| api_u_s.h.txt | Text Document | 10 | KB | Tue Sep. 25, 2001 1:23 PM |
| api_v.h.txt | Text Document | 113 | B | Tue Sep. 25, 2001 1:23 PM |
| apie.c.exe | Application | 4 | KB | Tue Sep. 25, 2001 1:24 PM |
| apii.c.exe | Application | 92 | KB | Tue Sep. 25, 2001 1:24 PM |
| apimain.c.exe | Application | 1 | KB | Tue Sep. 25, 2001 1:25 PM |
| apio.c.exe | Application | 53 | KB | Tue Sep. 25, 2001 1:25 PM |
| apip.c.exe | Application | 200 | KB | Tue Sep. 25, 2001 1:25 PM |
| apip_g.c.exe | Application | 4 | KB | Tue Sep. 25, 2001 1:26 PM |
| apip_s.c.exe | Application | 1 | KB | Tue Sep. 25, 2001 1:26 PM |
| apisaf.c.exe | Application | 134 | KB | Tue Sep. 25, 2001 1:26 PM |
| apit.c.exe | Application | 33 | KB | Tue Sep. 25, 2001 1:27 PM |
| apiu.c.exe | Application | 536 | KB | Tue Sep. 25, 2001 1:27 PM |
| apiwmain.c.exe | Application | 864 | B | Tue Sep. 25, 2001 1:28 PM |
| brass.h.txt | Text Document | 294 | B | Tue Sep. 25, 2001 1:28 PM |
| brass_constants.h.txt | Text Document | 6 | KB | Tue Sep. 25, 2001 1:28 PM |
| brass_defs.h.txt | Text Document | 8 | KB | Tue Sep. 25, 2001 1:28 PM |
| dd.c.exe | Application | 22 | KB | Tue Sep. 25, 2001 1:29 PM |
| dd_app.c.exe | Application | 16 | KB | Tue Sep. 25, 2001 1:29 PM |
| dd_constants.h.txt | Text Document | 6 | KB | Tue Sep. 25, 2001 1:29 PM |
| dd_defs.h.txt | Text Document | 8 | KB | Tue Sep. 25, 2001 1:29 PM |
| ddio.c.exe | Application | 20 | KB | Tue Sep. 25, 2001 1:30 PM |
| ddlog.c.exe | Application | 41 | KB | Tue Sep. 25, 2001 1:30 PM |
| ddp.c.exe | Application | 100 | KB | Tue Sep. 25, 2001 1:30 PM |
| ddp_hr.c.exe | Application | 46 | KB | Tue Sep. 25, 2001 1:21 PM |
| ddp_pier.c.exe | Application | 30 | KB | Tue Sep. 25, 2001 1:51 PM |
| ddt.c.exe | Application | 1 | KB | Tue Sep. 25, 2001 1:44 PM |
| ddu_filter.c.exe | Application | 105 | KB | Tue Sep. 25, 2001 1:44 PM |
| ddu_hr.c.exe | Application | 37 | KB | Tue Sep. 25, 2001 1:44 PM |
| ddu_misc.c.exe | Application | 72 | KB | Tue Sep. 25, 2001 1:45 PM |
| ddu_reg.c.exe | Application | 45 | KB | Tue Sep. 25, 2001 1:45 PM |
| ddu_req.c.exe | Application | 50 | KB | Tue Sep. 25, 2001 1:45 PM |
| ddu_sub.c.exe | Application | 75 | KB | Tue Sep. 25, 2001 1:46 PM |
| duo.c.exe | Application | 10 | KB | Tue Sep. 25, 2001 1:46 PM |
| duo.h.txt | Text Document | 108 | B | Tue Sep. 25, 2001 1:46 PM |
| duo_c.h.txt | Text Document | 509 | B | Tue Sep. 25, 2001 1:47 PM |
| duo_d.h.txt | Text Document | 1 | KB | Tue Sep. 25, 2001 1:47 PM |
| duo_f.h.txt | Text Document | 1 | KB | Tue Sep. 25, 2001 1:47 PM |
| duou.c.exe | Application | 11 | KB | Tue Sep. 25, 2001 1:47 PM |
| exchange.h.txt | Text Document | 1 | KB | Tue Sep. 25, 2001 1:47 PM |
| exchproto.h.txt | Text Document | 2 | KB | Tue Sep. 25, 2001 1:48 PM |
| fsm.c.exe | Application | 15 | KB | Tue Sep. 25, 2001 1:48 PM |
| fsm.h.txt | Text Document | 108 | B | Tue Sep. 25, 2001 1:48 PM |
| fsm_c.h.txt | Text Document | 676 | B | Tue Sep. 25, 2001 1:48 PM |
| fsm_d.h.txt | Text Document | 641 | B | Tue Sep. 25, 2001 1:48 PM |
| fsm_f.h.txt | Text Document | 1 | KB | Tue Sep. 25, 2001 1:49 PM |
| hash.c.exe | Application | 23 | KB | Tue Sep. 25, 2001 1:49 PM |
| hash.h.txt | Text Document | 113 | B | Tue Sep. 25, 2001 1:49 PM |
| hash_c.h.txt | Text Document | 554 | B | Tue Sep. 25, 2001 1:49 PM |
| hash_d.h.txt | Text Document | 1 | KB | Tue Sep. 25, 2001 1:50 PM |
| hash_f.h.txt | Text Document | 2 | KB | Tue Sep. 25, 2001 1:50 PM |
| hashr.c.exe | Application | 5 | KB | Tue Sep. 25, 2001 1:50 PM |
| hstg.h.txt | Text Document | 117 | B | Tue Sep. 25, 2001 1:50 PM |
| hstg_c.h.txt | Text Document | 355 | B | Tue Sep. 25, 2001 1:50 PM |
| hstg_d.h.txt | Text Document | 572 | B | Tue Sep. 25, 2001 1:43 PM |
| hstg_f.h.txt | Text Document | 995 | B | Tue Sep. 25, 2001 1:43 PM |
| hstgrm.c.exe | Application | 8 | KB | Tue Sep. 25, 2001 1:35 PM |

-continued

| NAME | TYPE | SIZE | MODIFIED |
|---|---|---|---|
| kid.c.exe | Application | 57 KB | Tue Sep. 25, 2001 1:35 PM |
| kid.h.txt | Text Document | 108 B | Tue Sep. 25, 2001 1:35 PM |
| kid_c.h.txt | Text Document | 718 B | Tue Sep. 25, 2001 1:36 PM |
| kid_d.h.txt | Text Document | 3 KB | Tue Sep. 25, 2001 1:36 PM |
| kid_f.h.txt | Text Document | 7 KB | Tue Sep. 25, 2001 1:36 PM |
| kidu.c.exe | Application | 41 KB | Tue Sep. 25, 2001 1:36 PM |
| kit.h.txt | Text Document | 568 B | Tue Sep. 25, 2001 1:36 PM |
| kit_c.h.txt | Text Document | 4 KB | Tue Sep. 25, 2001 1:37 PM |
| kit_d.h.txt | Text Document | 7 KB | Tue Sep. 25, 2001 1:37 PM |
| kit_f.h.txt | Text Document | 1 B | Tue Sep. 25, 2001 1:37 PM |
| kit_v.h.txt | Text Document | 113 B | Tue Sep. 25, 2001 1:37 PM |
| lex.c.exe | Application | 14 KB | Tue Sep. 25, 2001 1:38 PM |
| lex.h.txt | Text Document | 108 B | Tue Sep. 25, 2001 1:38 PM |
| lex_c.h.txt | Text Document | 336 B | Tue Sep. 25, 2001 1:38 PM |
| lex_d.h.txt | Text Document | 1 KB | Tue Sep. 25, 2001 1:38 PM |
| lex_f.h.txt | Text Document | 2 KB | Tue Sep. 25, 2001 1:39 PM |
| lexu.c.exe | Application | 1 KB | Tue Sep. 25, 2001 1:39 PM |
| lifo.c.exe | Application | 6 KB | Tue Sep. 25, 2001 1:39 PM |
| lifo.h.txt | Text Document | 113 B | Tue Sep. 25, 2001 1:40 PM |
| lifo_c.h.txt | Text Document | 452 B | Tue Sep. 25, 2001 1:40 PM |
| lifo_d.h.txt | Text Document | 724 B | Tue Sep. 25, 2001 1:40 PM |
| lifo_f.h.txt | Text Document | 1 KB | Tue Sep. 25, 2001 1:41 PM |
| lifou.c.exe | Application | 1 KB | Tue Sep. 25, 2001 1:42 PM |
| ll.c.exe | Application | 17 KB | Tue Sep. 25, 2001 1:42 PM |
| ll.h.txt | Text Document | 103 B | Tue Sep. 25, 2001 1:42 PM |
| ll_c.h.txt | Text Document | 1 KB | Tue Sep. 25, 2001 1:42 PM |
| ll_d.h.txt | Text Document | 749 B | Tue Sep. 25, 2001 1:43 PM |
| ll_f.h.txt | Text Document | 2 KB | Tue Sep. 25, 2001 1:34 PM |
| Mail.txt | Text Document | 1 MB | Tue Sep. 25, 2001 1:32 PM |

BACKGROUND OF THE INVENTION

The present invention relates to a method and apparatus to route a message from its sender to recipients based on the message's content and based on each potential recipient's interest in some or all of such content.

Historically, messages (electronic, hand written, . . . ) have been routed based on an address associated with each message which has been provided by each message's sender. Postal services, package delivery services, Ethernet, Internet Protocol (IP), . . . , all work on this premise. This is called Address Based Routing. A premise of Address based Routing is that the sender must know the address of the recipient of the message in order to send the message.

SUMMARY OF THE INVENTION

Content Based Routing is a method by which messages are routed based on the data contained in the message (its content) and based on interest for such data. Content Based Routing is implemented by a Content Based Router (a person or a device (mechanical, electronic, or otherwise)—abbreviated as CBR). A Content Based Router accepts messages from senders and accepts and remembers interest criteria from potential recipients. When a Content Based Router gets a message from a sender it compares the content of the message against the interest criteria of its potential recipients and sends the message to each potential recipient for whom there is a match. A premise of Content Based Routing is that a sender need only know the address of the Content Based Router to which it will send the message in order to send the message. This gives the sender and potential recipients the ability to remain anonymous to each other.

Accordingly, it is an object of the invention to provide an apparatus and method for content based routing wherein user may register positive interest criteria for receiving messages and negative interest criteria for prevention of receiving messages. In particular, the method is applicable to processing of else messages which have neither a response nor a request field. The positive interest criteria for else messages is provided in a first minimized table for the client and also in a global table. The negative interest criteria for else messages is provided in a second minimized table for the client.

In accordance with these and other objects of the invention, there is provided a method of routing messages based on content comprising the following steps. Receiving messages from clients including response messages having a response field, request messages having a request field, and else messages having neither a response field nor a request field. Processing the response messages by determining if the response messages have a sender id and sending the response messages to the sender id when present. Processing the request messages in accordance with contents of the request fields and rules associated therewith including registering interest criteria for ones of the clients for interest in ones of the else messages. The registering of interest criteria includes processing positive else registration requests by storing positive else registration request data in a first set associated with a sender id of the client sending the request message, and processing negative else registration requests by storing negative else registration request data in a second set associated with the sender id of the client sending the request message. A further step of the method includes processing else messages by the following steps for each respective one of the respective ones of the clients: testing data of the else message for correspondence with the positive else registration data of the respective one of the clients; testing data of the else message for correspondence with the negative else registration data of the respective one of the clients; and sending the else message to the respective one of the clients only if there is correspondence with the positive else registration data of the respective one of the clients and the is not correspondence with the negative else registration data of the respective one of the clients.

The above, and other objects, features and advantages of the present invention will become apparent from the following description read in conjunction with the accompanying drawings.

DETAILED DESCRIPTION

Provided herewith is a computer program listing appendix on a compact disks which provides a source code listing of content based router programing for implementing various aspects of the present invention as described herein.

Implementation of a Content Based Router of the present invention is achieved as described below. Meaningful communication requires agreement between sender and recipient on the structure of the messages to be exchanged. In this implementation of a Content Based Router all messages are made up of 0 or more fields and each field is made up of an identifier (a field id) and 1 or more data items (a data item may be empty). This implementation of a Content Based Router also assigns special meaning to field ids request, response, response code, registration, rule, field list, private tag, and sender id (the names of these field ids are not necessarily the ones used in the accompanying code but have been chosen to improve clarity). If a message contains a field id of response, it is called a response message. If a message does not contain a field id of response but it does contain a field id of request it is called a request message. If a message does not contain a field id of response and does not contain a field id of request it is called an else message.

Figure 1:
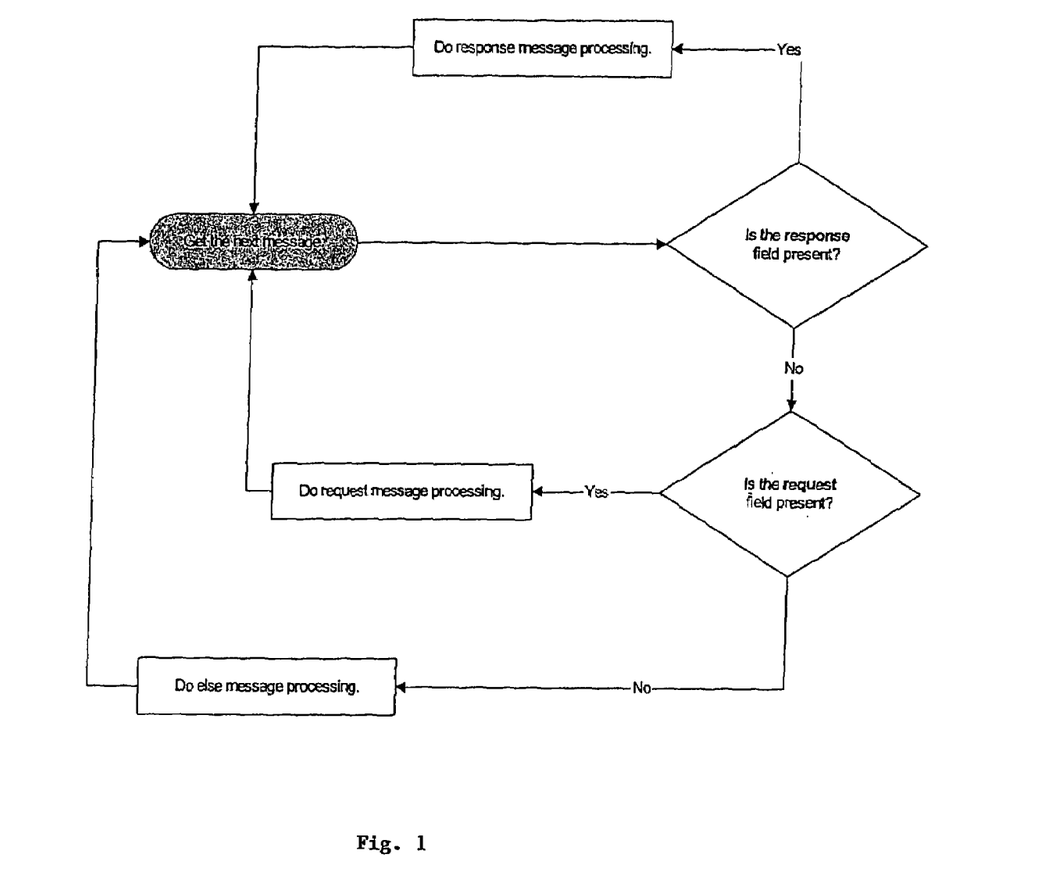
FIG. 1 is a flow chart for top level message processing.

Referring to the flow chart of FIG. 1, when a CBR gets a message it checks to see if the message is a response message, a request message or an else message and processes it accordingly (it does response processing for response messages, request processing for request messages and else processing for else messages).

Figure 2:
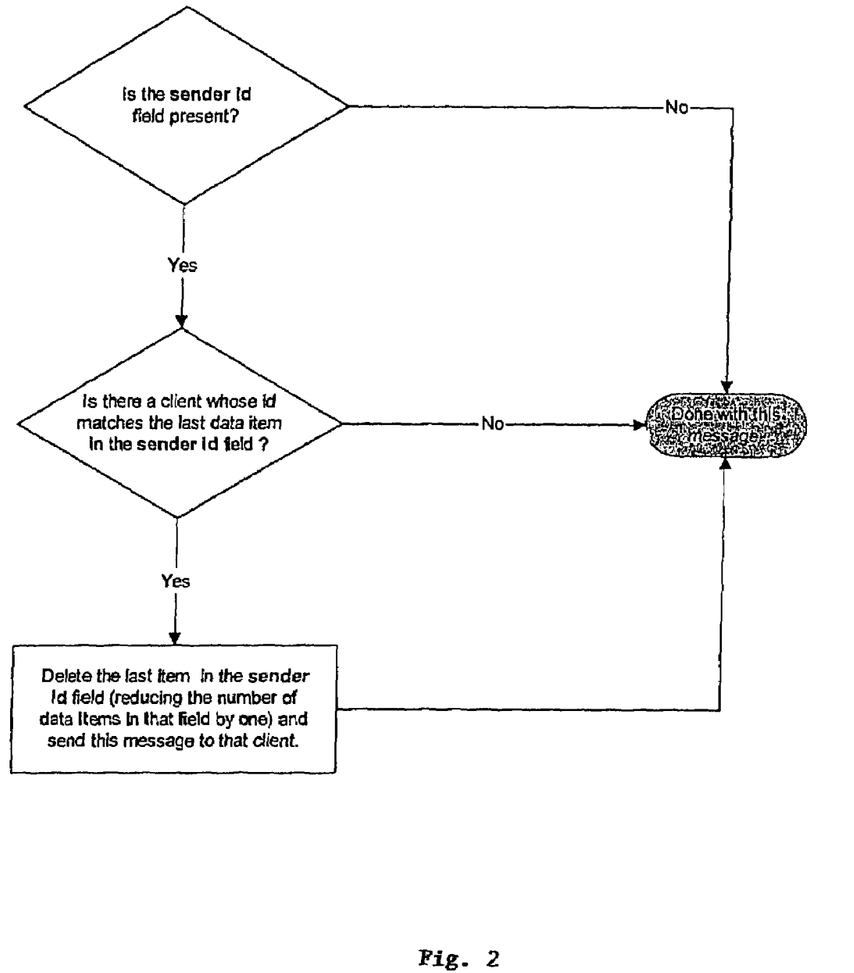
FIG. 2 is a flow chart for response message processing.

The flow chart of FIG. 2, shows a method for Response Message Processing of the present invention. Once a CBR identifies that a message is a response message it looks for the field identified by sender id. If such a field is not present in the message the CBR ignores the message. If such a field is present in the message it looks at the last data item in that field and attempts to locate a client whose id is identical. If it locates a client whose id is identical it then removes the last data item from the sender id field and sends the message to that client. Otherwise the CBR ignores the message.

Figure 3:
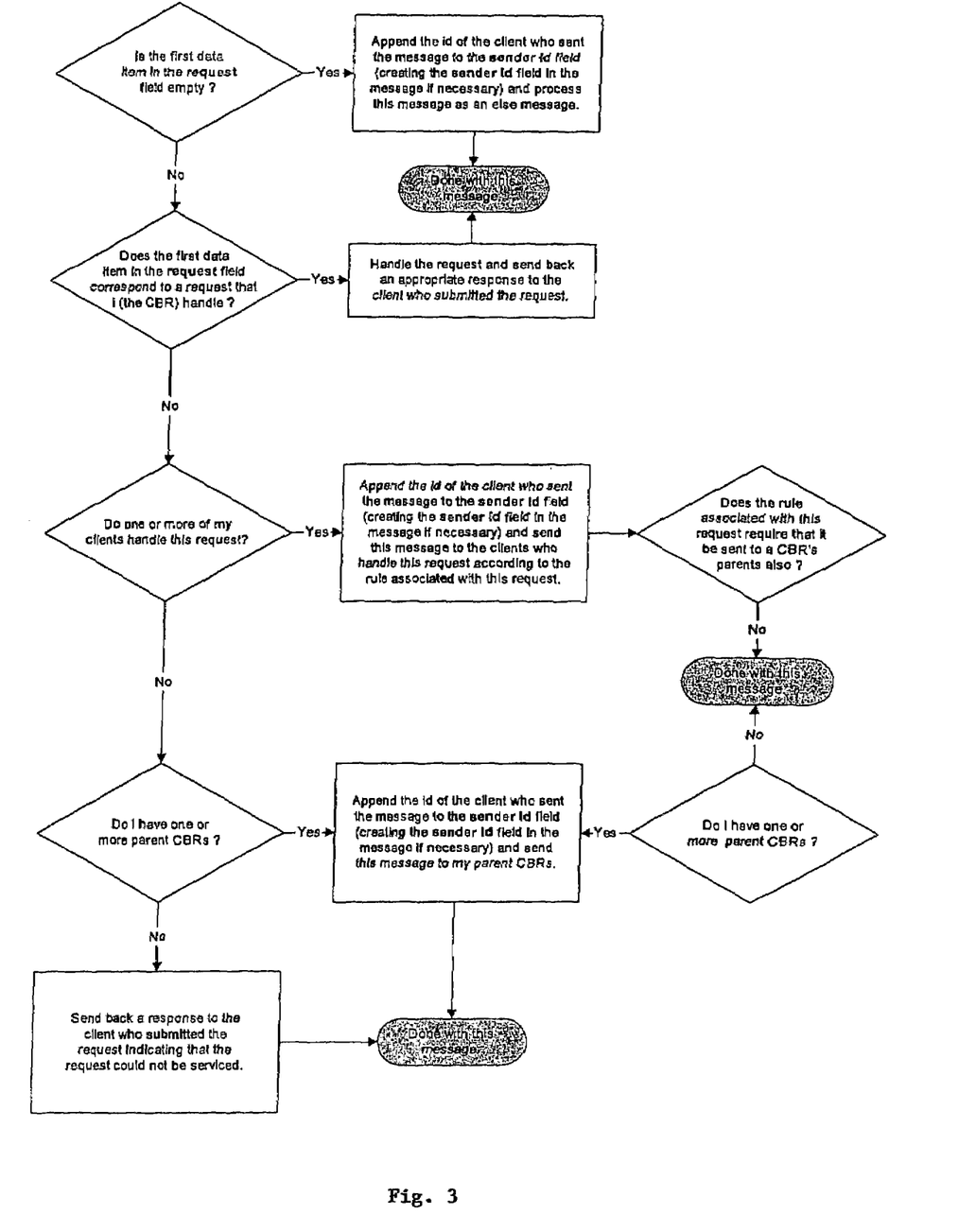
FIG. 3 is a flow chart for request message processing.

The flow chart of FIG. 3 shows an implementation of a method for Request Message Processing of the present invention. When a CBR identifies that a message is a request message it looks for the first data item in the field identified by request.

If the first data item in the request field is empty then it appends the id of the client who sent the message to the sender id field (creating the sender id field in the message if necessary) and processes the message as an else message. The request message is called an implicit request (the expectation here is that ultimately the recipients of this message who are not CBRs themselves will, once they identify that the message is an implicit request, create and send back an associated response message (implying receipt of the implicit request message)).

If the first data item in the request field is not empty then the CBR determines whether it itself handles a request identified by the first data item in the request field or one or more of its clients handles such a request.

If the CBR itself handles the request then the CBR does what it does to handle the request and sends back an appropriate response to the client who submitted the request.

A key requirement concerning the formation of a response (and this holds for any client of a CBR that handles requests—implicit or otherwise) is that each message of the response (a response may span more than one message) must contain, unaltered, the sender id and private tag fields from the request message that generated the response (the sender id field contains routing information created and used by the CBR and the private tag field contains information created and used by the creator of the request message—it is a way that a requestor may use the message's transport mechanism as a memory device). Each message must also contain a response field whose data items and their order are identical to the request field of the request message that generated the response. Finally, the last message in a response must contain a field identified by response code. A response code field containing only one data item and that data item is empty, implies that the request handling was completed without error. Any other contents in the response code field implies that the request handling was not completed or was not completed without error and can (at the discretion of the request handler) indicate the reasons for such error.

If the CBR itself does not handle the request then the CBR appends the id of the client who sent the request message to the sender id field (creating the sender id field in the message if necessary) and sends, according to the rule associated with the request, the request message to appropriate clients who have indicated that they themselves handle the request.

When interest criteria for request messages is posted by a client to a CBR, the client also indicates the rule to be applied to the request to determine which client or clients is/are to be sent the message. Though rules may be added or deleted, some commonly used rules are forward all (all clients posting interest criteria for this request are to be sent the request message) and round robin (the next client in the list of clients who have posted interest criteria for this request is to be sent the request message).

If the CBR itself does not handle the request and if none of the CBR's clients handle the request then the CBR sends back to the client who sent the request message a response message indicating that the request could not be serviced.

Figure 4:
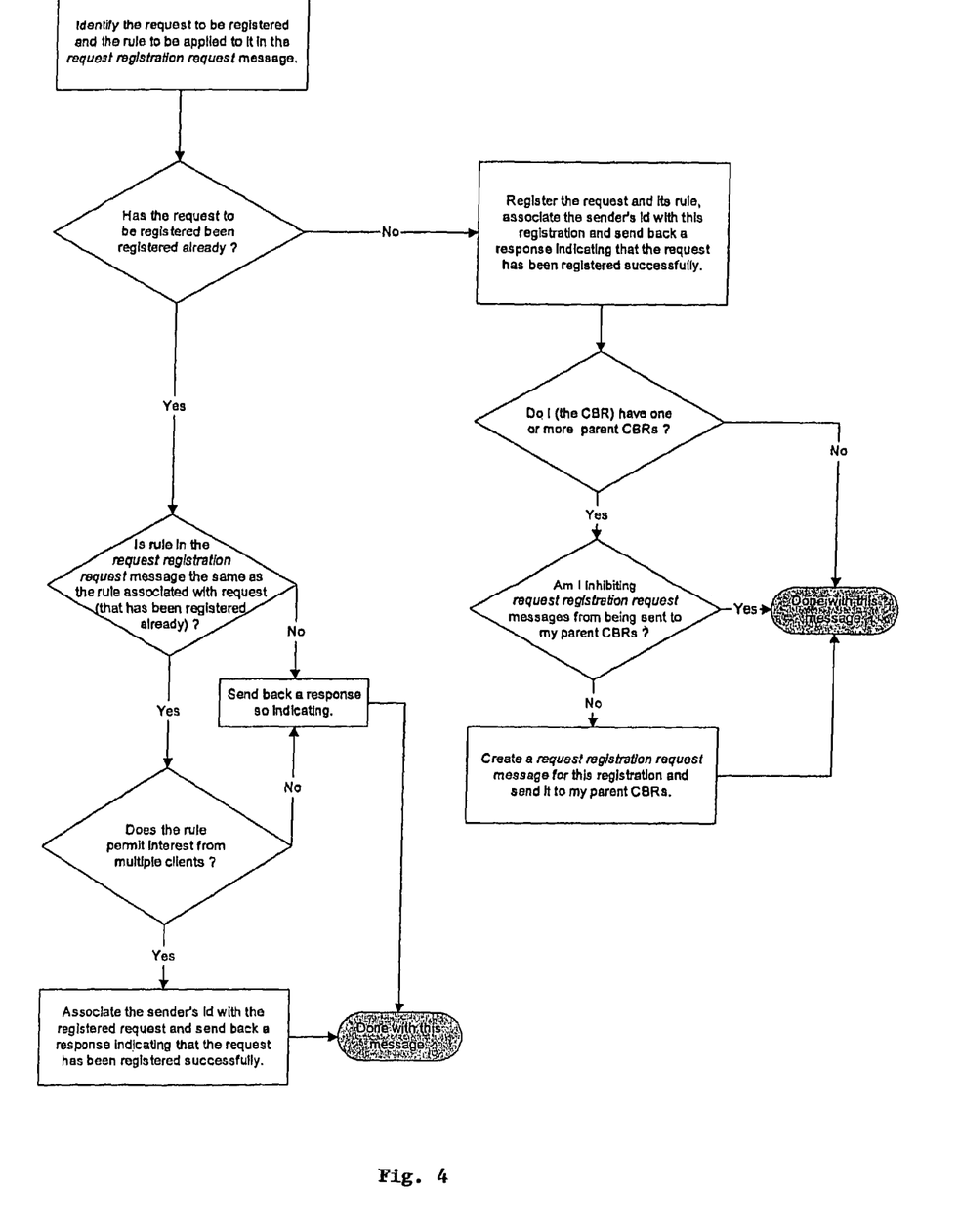
FIG. 4 is a flow chart for registering interest criteria for request messages.

The flow chart of FIG. 4, shows a method of Registering Interest Criteria for Request Messages of the present invention. A potential recipient may indicate his interest criteria for request messages by sending a request registration request message to the CBR. When the CBR gets a request registration request message it identifies the request to be registered (the first data item in the registration field or the second data item in the request field) and its associated rule (the first data item in the rule field). If interest in such a request has not been registered already, the CBR registers the request, associates the rule and the sender's id with it and sends back a response indicating that the request has been registered successfully.

If interest in such a request has been registered already, the CBR checks the rule associated with the registered request and compares it with the rule contained in the request message.

If the rules are not the same the CBR sends back a response so indicating.

If the rules are the same and they permit interest from multiple clients then the CBR associates the sender's id with the registered request and sends back a response indicating that the request has been registered successfully.

If the rules are the same and they do not permit interest from multiple clients or if the rules are not the same then the CBR sends back a response so indicating.

Figure 5:
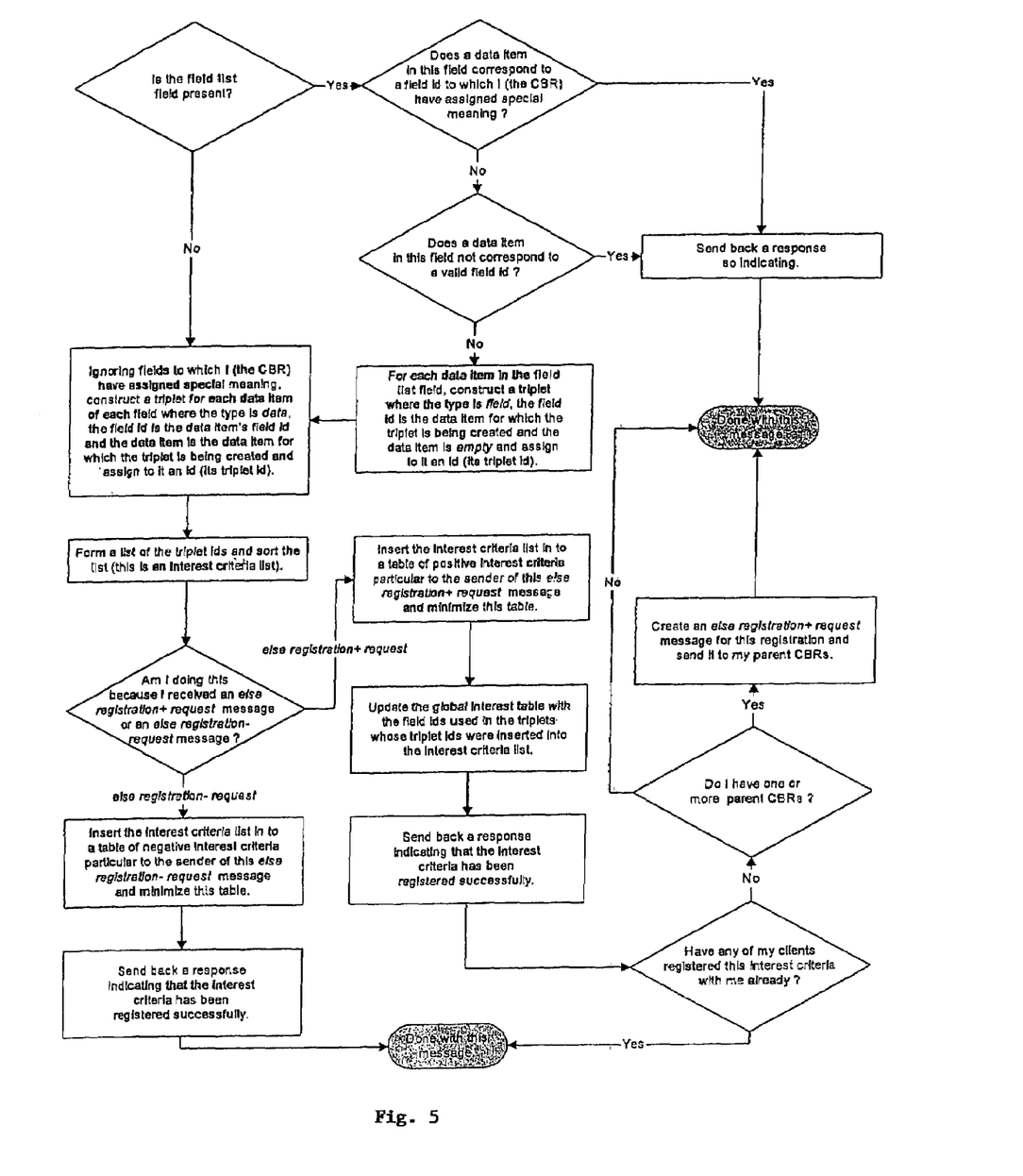
FIG. 5 is a flow chart for registering interest criteria for else messages.

FIG. 5 provides of flow chart of a method for Registering Interest Criteria for Else Messages of the present invention. A potential recipient may indicate his interest criteria for else messages by sending either an else registration+request message (which corresponds to criteria for else messages the potential recipient wants) or an else registration—request message to the CBR (which corresponds to criteria for else messages the potential recipient does not want).

When the CBR gets an else registration request+message it looks at the field list field and all other fields that it has not assigned special meaning. To each data item in each of these fields it associates a type, a field id and a data item (this is known as a triplet) as follows:

If the field id is field list
  if the data item corresponds to a field id to which it has assigned special meaning or if the data item does not correspond to a valid field id, it sends back a response so indicating
  else the type is field, the field id is the data item for which the triplet is being created and the data item is empty
If the field id is not field list then the type is data, the field id is the data item's field id and the data item is the data item for which the triplet is being created.

For example (here field ids are terminated by ":", are followed by zero or more data items (space separated) and fields are terminated by ","):
  A CBR gets the following message:
    greeting : hello, name : shayla jolene, request : "interest criteria registration", field list : text, news :,
  It detects that this message is a request message and that the request is else registration. It forms triplets for each data item in the field list field and for each data item in the other fields (greeting, name and news) but not for the data item in the request field. The triplets are:
    "data greeting hello" for hello in the greeting field
    "data name shayla" for shayla in the name field
    "data name jolene" for jolene in the name field
    "field text empty" for text in the field list field and
    "data news empty" for the empty data item in the news field.

Each triplet is assigned a number (this is known as its triplet id) such that if the same triplet is constructed subsequently, it may be referred to by the same triplet id it was assigned initially. As each triplet is constructed the CBR adds its triplet id to a list of triplet ids particular to this message (this list is known as an interest criteria list). When the interest criteria list has been completed the CBR sorts the list, inserts it into a table of interest criteria lists for wanted messages particular to the sender of this else registration+request message and minimizes this table. It also updates a table it maintains with the field ids used in the triplets whose ids were inserted into the interest criteria list. The contents of this table is the union of all the field ids in all the triplets whose triplet ids make up all the interest criteria lists of all the CBR's clients (this is known as the global interest table).

The CBR then sends back a response indicating that the interest criteria indicated in the else registration+request message has been received and understood.

A key feature about the methods used by this CBR is that it provides a bijective mapping between an interest criteria list and a sorted numerical sequence. It also stores these sequences in a table that it minimizes.

When the CBR gets an else registration−request message it forms interest criteria lists as it does when it gets an else registration+request message but inserts them into and minimizes a table of interest criteria for unwanted messages particular to their sender. It does not update the global interest table.

Furthermore, registering Interest Criteria to Prevent a Client's Receipt of Else Messages It Itself Sends is implemented in the present invention. In order to prevent a potential client from receiving else messages it sends to a CBR that also meet its own interest criteria, a potential client may send a do not send me else messages I sent you request message to the CBR and the CBR will act accordingly.

Unregistering Interest Criteria is also implemented. A potential recipient may withdraw his interest criteria for request messages by sending a request unregistration request message to the CBR. When the CBR gets a request unregistration request message it identifies the request to be registered (the first data item in the registration field or the second data item in the request field), updates its request registration tables accordingly and sends back an appropriate response.

A potential recipient may withdraw his interest criteria for else messages by sending either an else unregistration+request message or an else unregistration−request message to the CBR. The CBR updates its tables accordingly and sends back an appropriate response.

Figure 6:
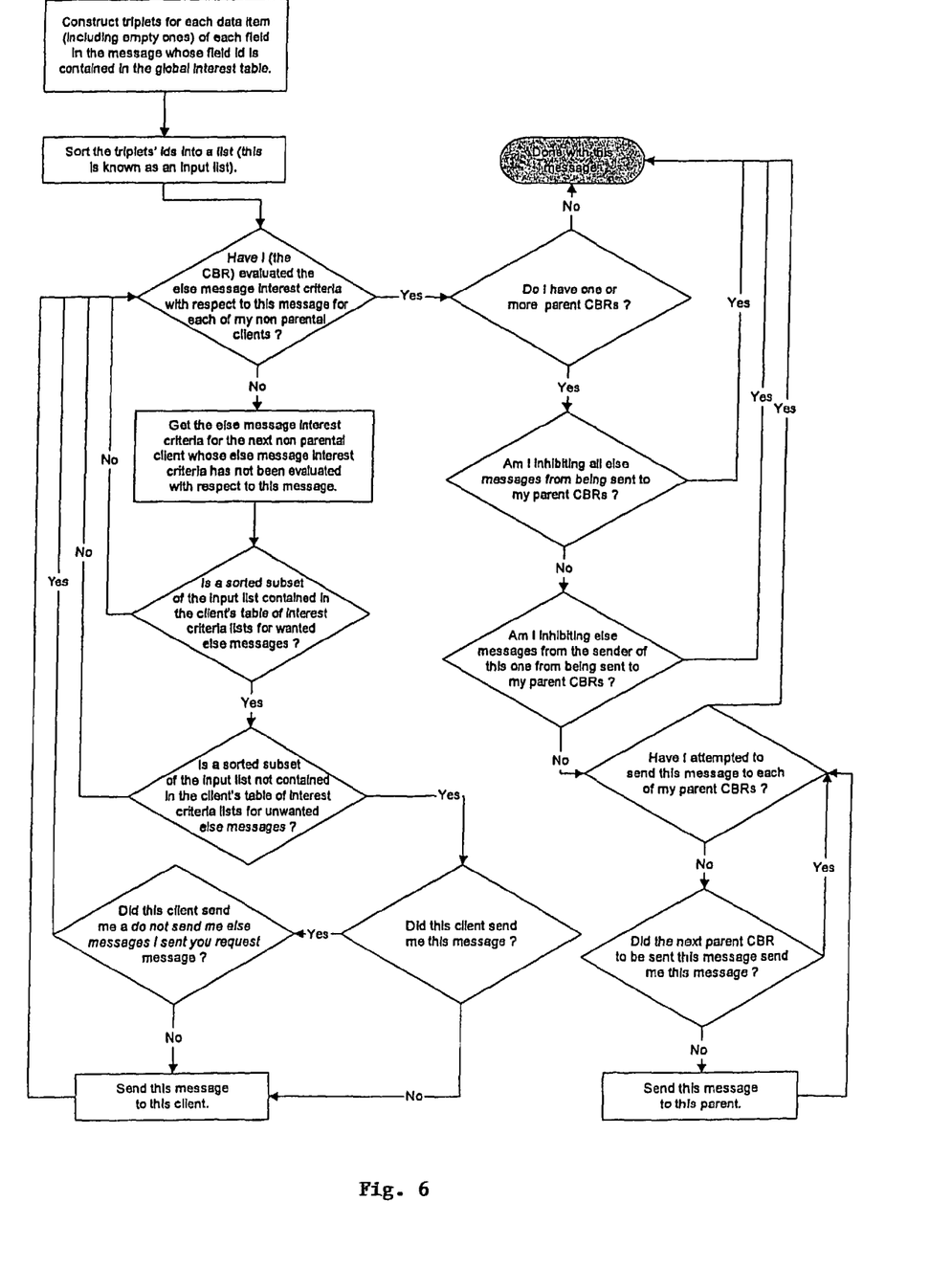
FIG. 6 is a flow chart for else message processing.

The flow chart of FIG. 6 shows a method of Else Message Processing of the present invention. When a CBR identifies that a message is an else message it tests the message to see if it satisfies it clients' interest criteria for else messages. As each of its clients may have different interest criteria for else messages it makes this test for each of its clients. As a clients' interest criteria for else messages is organized in 2 sets (interest criteria for wanted else messages and interest criteria for unwanted else messages) it first applies the interest criteria for wanted else messages and if that criteria is satisfied, applies the interest criteria for unwanted else messages. Only if an else messages satisfies the interest criteria for wanted else messages and does not satisfy the criteria for unwanted else messages is an else message sent to a client.

Specifically, when a CBR identifies that a message is an else message it attempts to locate each field id in the message that is in its global interest table. It then constructs triplets for each data item in each of the fields in the else message whose ids were found in the global interest table (and for fields in the else message whose ids were found in the global interest table but do not contain data items), and forms a sorted list of their triplet ids (this list is known as an input list).

The CBR then performs the following evaluation for each of its clients The input list is compared with the client's table of interest criteria lists for wanted else messages.

If a sorted subset of the input list is contained in the client's table of interest criteria lists for wanted else messages, then there is general interest in that else message for that client.

If there is general interest in that else message for that client, the input list is then compared with the client's table of interest criteria lists for unwanted else messages.

If a sorted subset of the input list is not contained in the client's table of interest criteria list for unwanted else messages then there is no unwanted interest in that else message for that client.

If, for that client, there is general interest and there is no unwanted interest in the else message, the else message is sent to that client.

Parent CBRs are established by the present invention. When a client connects to a CBR a parent/child relationship is established. The initiator of the connection is called the child. The CBR to whom the client connected is called the parent. CBRs having a common parent are called siblings. A child CBR of a parent CBR is a grandchild CBR of the parent CBR's parent CBRs and so on (seniors and cousins).

When a message is sent from a child to a parent it is moving up. When a message is sent from a parent to a child it is moving down.

A child CBR maintains a list of its parents, a parent CBR sees its children CBRs as other clients—it does not distinguish them from any other clients.

Registering Interest Criteria with a Parent is further accomplished by the present invention. Since, from a parent CBR's point of view, a child CBR is just another client, in order for messages to be sent to a child CBR from its parent, the child CBR must register with its parent CBR the criteria for wanted else messages and for request messages that are of interest to its own clients. This registration occurs upon connection to its parent and also when the child CBR receives any new interest criteria (request message registrations and wanted else message registrations). Likewise, when an interest criteria is removed by a client of a child CBR, if such interest criteria is not shared by any of that CBR's other clients, the CBR, will send request messages to its parents to unregister that interest criteria. When a client terminates its connection to a child CBR (or when a child CBR detects that a client's connection is no longer valid), the CBR will send request messages to its parents to unregister all of the interest criteria of that client that is not shared by the CBR's other clients.

Else Message Propagation is also implemented in the present invention. To ensure that an else message received by a CBR can get to the clients of its parents (should there be such interest), a child CBR unconditionally sends all else messages it receives to its parents. However, to prevent messages it sends to its parents from being sent back, even when such messages meet the interest criteria it has registered with its parents, upon connection to a parent, a child CBR sends it a do not send me else messages I sent you request message.

Request Message Propagation is further implemented in the present invention. When a child CBR receives a request message, if it itself cannot service the request and if none of its clients have registered interest criteria for that request, instead of sending back to the client who sent the request message a response message indicating that the request could not be serviced, the CBR appends the id of the client who sent the request message to the send id field (creating the sender id field in the message if necessary) and sends it to its parents (a child CBR may do this even when one or more of its clients can service the request if the rule associated with the request provides for multiple concurrent responders).

The present invention still further provides for Hiding Messages from Parent, Sibling and Senior CBRs. Sometimes it is desirable for a CBR to shield its parent, sibling, senior and cousin CBRs from the else messages of one or more of its clients or to shield its parent, sibling, senior and cousin CBRs from all its else messages and all its request registration request messages. A child CBR may operate in either, both or none of these modes.

The following description relates to connecting CBRs. Provided that CBRs are not operating in a shielding mode:

CBRs connected together in a tree structure will enable any else message and any request message (subject to its registration rule) to get to any client for which such interest has been registered.

CBRs connected together in a loop may enable messages to travel through them indefinitely.

Else messages move up a tree of CBRs unconditionally and move down a tree of CBRs by interest criteria registration only.

Interest criteria registration moves up a tree of CBRs unconditionally.

A CBR holds the union of interest criteria for all points below it in a CBR tree.

Peer CBRs may also be established by the method of the present invention. A tree of CBRs can be connected to another tree of CBRs such that messages from one tree may flow into the other but messages from the receiving tree will not flow into the sending tree. When a receiving CBR connects to a sending CBR, instead of updating its list of parent CBRs with the id of the sending CBR, it updates its list of peer CBRs to whom it has connected with the id of the sending CBR, registers with the sending CBR the criteria for wanted else messages that are of interest to its own clients and sends to the sending CBR a mark peer request message. Subsequently, as this criteria changes, the receiving CBR notifies the sending CBR.

When a sending CBR receives a mark peer request message, it updates its list of peer CBRs who have connected to it with the id of the child that sent the mark peer request message (the child is the receiving CBR) and registers with that receiving CBR the criteria for request messages that are of interest to its own clients. Subsequently, as this criteria changes, the sending CBR notifies the receiving CBR.

Suppression of Some Messages From a Client is further provided for by the present invention. If a client of a CBR wishes to operate as part of a set of redundant clients, and that set of clients has the property of allowing only one of the set to respond to request messages and to send else messages, then each of the other clients in that set may send a suppress some of my messages request message to the CBR. When a CBR gets a response message or an else message from such a client it ignores the message. All other messages from such a client are processed normally. This facilitates a client's ability to act as a backup to another client (or to be part of a set of backups to another client)—the clients may be identical except for the issuance of the suppress some of my messages request message.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of routing messages based on content comprising the steps of:
receiving messages from clients including response messages having a response field, request messages having a request field, and else messages having neither a response field nor a request field;
processing said response messages by determining if said response messages have a sender id and sending said response messages to the client represented by the sender id when present;
processing said request messages in accordance with contents of said request fields and rules associated therewith including registering interest criteria for ones of said clients for interest in ones of said else messages, said registering of interest criteria including:
processing positive else registration requests by storing positive else registration request data in a first set associated with the sender id of the client sending said request messages; and
processing negative else registration requests by storing negative else registration request data in a second set associated with said sender id of the client sending said request messages; and
said method further comprising processing else messages by the following steps for each respective one of said respective ones of said clients:
testing data of said else messages for correspondence with said positive else registration data of said respective one of said clients;
testing data of said else messages for correspondence with said negative else registration data of said respective one of said clients; and
sending said else messages to said respective one of said clients only if there is correspondence with said positive else registration data of said respective one of said clients and there is no correspondence with said negative else registration data of said respective one of said clients.

2. A method of directing a message between a plurality of hosts, each host communicating to a router host, wherein the router host is adapted for routing messages;
said method comprising the steps of:
receiving the message from a first host, the first host being one of said plurality of hosts;
the message including fields, each field being further adapted for including one or more associated data items;
the method further comprising:
categorizing the message based on the fields in the message and processing the message based on the message category;
the processing step including:
identifying interest criteria for said first host from the fields in the massage, the interest criteria indicating positive or negative interest relating to information to be forwarded to said first host and storing the positive and negative interest criteria for said first host; or
forwarding a message to said plurality of hosts for which information in the message matches information identified as positive interest criteria and for which information in the message does not match information identified as negative interest criteria.

3. The method of claim 2 wherein the fields include none or more of a response field and/or a request field;
the step of categorizing each message further comprises:
determining that the message is a response message if the message contains a response field;
determining that the message is a request message if the message contains a request field and does not contain a response field; and
determining that the message is an else message if the message does not contain either a response field or a request field.

4. The method of claim 3 wherein the message is a request message, the request message being an else-registration-positive request message or an else-registration-negative request message, wherein:
the else-registration-positive request message is indicative of messages the first host wants to receive; and
the else-registration-negative request message is indicative of messages the first host does not want to receive.

5. The method of claim 4 wherein the message is an else-registration-positive request message, the interest criteria field contains a field-list field and/or previously undefined fields, and the step of processing the message further comprises:
analyzing the field-list field, the previously undefined fields and associated data items for each previously undefined field;
sending a response to the first host; and
generating or updating a table of wanted else message criteria for the first host with the results of the analysis of the field-list field and of the previously undefined fields and the associated data items.

6. The method of claim 4 wherein the message is an else-registration-negative request message, the interest criteria field contains a field-list field and/or previously undefined fields, and the step of processing the message further comprises:
analyzing the field-list field, the previously undefined fields and associated data items for each field;
sending a response to the first host; and
generating or updating a table of unwanted else message criteria for the first host with the results of the analysis of the field-list field and of the previously undefined fields and the associated data items.

7. The method of claim 3 wherein the message is an else message, the router includes a table of wanted else message criteria and a table of unwanted else message criteria for each host, and the step of processing the else message further comprises:
for each host, comparing the contents of the fields of the else message with the contents of the wanted else message criteria table for the host and determining if the else message is a wanted else message; and
if the else message is a wanted else message for the host, then comparing the contents or the fields of the else message with the contents of the unwanted else message criteria table for the host and determining if the else message is an unwanted else message; and
forwarding the else message to the host if the message is a wanted else message and is not an unwanted else message for the host.

8. The method of claim 2 wherein said one or more of said plurality of hosts is a router host.

* * * * *